(12) United States Patent
Shigeoka et al.

(10) Patent No.: US 7,677,808 B2
(45) Date of Patent: Mar. 16, 2010

(54) BEARING APPARATUS FOR A DRIVING WHEEL OF A VEHICLE

(75) Inventors: Kazuhisa Shigeoka, Shizuoka-ken (JP); Hiroshi Kawamura, Shizuoka-ken (JP)

(73) Assignee: NTN Corporation (JP)

( * ) Notice: Subject to any disclaimer, the term of this patent is extended or adjusted under 35 U.S.C. 154(b) by 570 days.

(21) Appl. No.: 11/409,476

(22) Filed: Apr. 21, 2006

(65) Prior Publication Data
US 2006/0239600 A1 Oct. 26, 2006

(30) Foreign Application Priority Data
Apr. 22, 2005 (JP) ............................. 2005-124589

(51) Int. Cl.
*F16C 13/00* (2006.01)
(52) U.S. Cl. ...................... 384/544; 384/589
(58) Field of Classification Search ................. 384/544, 384/589
See application file for complete search history.

(56) References Cited

U.S. PATENT DOCUMENTS

| | | | | |
|---|---|---|---|---|
| 5,782,566 | A | * | 7/1998 | Bertetti ........................ 384/537 |
| 6,217,220 | B1 | * | 4/2001 | Ohkuma et al. ............. 384/489 |
| 2002/0067875 | A1 | * | 6/2002 | Toda et al. ................... 384/544 |
| 2005/0018939 | A1 | * | 1/2005 | Niwa et al. .................. 384/544 |

FOREIGN PATENT DOCUMENTS

| | | |
|---|---|---|
| JP | 2000-110840 | 4/2000 |
| JP | 2003-097588 | 4/2003 |
| JP | 2005-024020 | 1/2005 |
| JP | 2005-075229 | 3/2005 |

* cited by examiner

*Primary Examiner*—Thomas R Hannon
(74) *Attorney, Agent, or Firm*—Harness, Dickey & Pierce, P.L.C.

(57) ABSTRACT

A bearing apparatus for a driving wheel of a vehicle has an outer member (2), inner member (5, 6), rolling elements (4), outer joint member (61) and a cover (11, 67). The outer member (2) is formed with double row outer raceway surfaces (2a) on its inner peripheral surface The inner member (5, 6) include a wheel hub (2) with an integrally formed wheel mounting flange (7) at one end and an axially extending cylindrical portion (5b, 13b) of a smaller diameter. At least one inner ring (6) is press fit onto the cylindrical portion (5b, 13b). The inner member (5, 6) is formed with double row inner raceway surfaces (5a, 6a) arranged opposite to the double row outer raceway surfaces (2a). The double row rolling elements (4) are freely rollably contained between the outer and inner raceway surfaces (2a and 5a, 6a). The outer joint member (61) of a constant velocity universal joint (53) is integrally formed with a shaft portion (60) which is inserted into the inner member (5, 6) in a torque transmitting manner and is axially fastened by a nut (63) so that it abuts the inner member (5, 6). Lubricant is applied to the end face of the inner member (6) that abuts the outer joint member (61). The cover (11, 17) is mounted on the end of the inner member (6). The cover (11, 17) has a fitting portion (11a, 17a) adapted to be inserted into the cylindrical portion (5b, 13b) and an annular bottom portion (11c, 17b) to cover the end of the inner member (6).

2 Claims, 5 Drawing Sheets

(b)

(a)

(a)     (b)

United States Patent US 7,677,808 B2

BEARING APPARATUS FOR A DRIVING WHEEL OF A VEHICLE

CROSS-REFERENCE TO RELATED APPLICATIONS

This application claims priority to Japanese Patent Application No. 2005-124589, filed Apr. 22, 2005, which application is herein expressly incorporated by reference.

FIELD

The present invention relates to a bearing apparatus for a driving wheel of a vehicle. The bearing apparatus supports a driving wheel of a vehicle, such as an automobile. The bearing apparatus, for the driving wheel of a vehicle, transmits torque and is separably connected to an outer joint member of a constant velocity universal joint. The bearing apparatus is structured as a unit of a wheel hub and a double row rolling bearing.

BACKGROUND

The power transmitting apparatus, to transmit the engine power of vehicle to its wheels, transmits power from an engine to the wheels. The power transmitting apparatus enables radial and axial displacement of the wheels and moment variation. Accordingly, a drive shaft interposed between the engine and the driving wheel is connected at its one end to a differential gear, via a constant velocity universal joint of the slide type, and at the other end to the driving wheel, via a bearing apparatus for the driving wheel which includes an immovable constant velocity universal joint.

Several types of bearing apparatus for a wheel of a vehicle have been proposed, and for example one is shown in FIG. 5. The bearing apparatus for a wheel of a vehicle 50 includes a wheel hub 51, able to mount on its one end a driving wheel W and a brake rotor B, a double row rolling bearing 52, and an immovable constant velocity universal joint 53. The joint 53 is connected to the wheel hub 51 to transmit power of the drive shaft (not shown) to the wheel hub 51.

The wheel hub 51 has an integrally formed wheel mounting flange 54 at one end to mount the driving wheel W and brake rotor B. The wheel hub 51 also has an axially extending cylindrical portion 51a of a smaller diameter. The double row rolling bearing 52, formed as a double row angular ball bearing, has an outer ring 55, a pair of inner rings 56, and a double row of balls 58 held by cage 57. The outer ring 55, on its inner circumferential surface, is formed with double row outer raceway surfaces 55a. The rolling bearing 52 is arranged between a knuckle N, forming a part of a suspension apparatus, and the cylindrical portion 51a of the wheel hub 51. The pair of inner rings 56 are each formed with an inner raceway surface 56a arranged opposite to the double row outer raceway surfaces 55a. The double row balls 58 are freely rollably contained in the cage 57 between the outer and inner raceway surfaces 55a and 56a.

The constant velocity universal joint 53 has a cup-shaped mouth portion (not shown), a shoulder portion 59 and an outer joint member 61. The shoulder portion 59 forms a bottom portion of the mouth portion. The outer joint member 61 is integrally formed with a shaft portion 60 which axially extends from the shoulder portion 59. The outer joint member 61 is adapted to be inserted into the wheel hub 51, via serrations, in a torque transmitting manner. The shaft portion 60 is inserted into the wheel hub 51 until the shoulder portion 59 abuts the inner ring 56 of the double row rolling bearing 52.

The constant velocity universal joint 53 is fastened at a predetermined fastening torque by a securing nut 63 secured onto a male thread 62 formed on the shaft portion 60. Thus, the wheel hub 51 and the outer joint member 61 can be axially separably connected to each other.

The driving wheel W is driven by an engine with a large torque, via a slide type constant velocity universal joint (not shown), at a low engine speed, for example at start-up of the vehicle. Thus, torsional deformation is caused in the drive shaft. This torsional deformation also causes torsional deformation in the inner ring 56 of the double row rolling bearing 52 supporting the drive shaft. When a large tortional deformation is caused in the drive shaft, if there is a circumferential gap between the serrations of the shaft portion 60 of the outer joint member 61 inserted into the wheel hub 51, a so-called "stick slip noise" is caused by abrupt slipping between the contacting surfaces of the outer joint member 61 and the inner ring 56.

One way to prevent the generation of the stick slip noise is to surface machine treat the end surface of the inner ring 56 which abuts the shoulder portion 59 of the outer joint member 61. That is, as shown in FIGS. 6 (a) and (b), grease grooves 64 are formed on the end faces 56b and 56c of the inner rings 56 to hold and promote lubricant, such as grease, in the grease grooves 64 in order to reduce frictional resistance between the abutting surfaces. Thus, this reduces or prevents the generation of the stick slip noise (see Japanese Laid-open Patent Publication No. 110840/2000).

However the lubricant, such as grease, after being applied to the abutting surfaces (end surfaces of the inner ring 56) is often placed in contact with a surface of a work table during assembly. Thus, this contact soils the lubricant during the assembling processes especially when the bearing apparatus is laid on the working table with its end, inner ring side, down in order to stabilize the joint in an upstanding condition on the table. In addition, the quality of the assembled products would be spoiled by foreign matter which enters the grease from the working table

SUMMARY

The present disclosure provides a bearing apparatus for a driving wheel of vehicle which substantially prevents, with a simple structure, lubricant, such as grease, applied to the end surface of the inner ring or a caulked portion of the wheel hub from being contacted by a work table. Thus, this prevents the lubricant from being contaminated by foreign matter which enters into the lubricant from the surface of a work table.

According to the present disclosure, a bearing apparatus for a driving wheel of a vehicle comprises an outer member, inner member, rolling elements and an outer joint member. The outer member with double row outer raceway surfaces is formed on its inner peripheral surface. The inner member includes a wheel hub with an integrally formed wheel mounting flange at one end and an axially extending cylindrical portion of a smaller diameter. At least one inner ring is press fit onto the cylindrical portion. The inner member is formed with double row inner raceway surfaces arranged opposite to the double row outer raceway surfaces. Double row rolling elements are freely rollably contained between the outer and inner raceway surfaces. An outer joint member of a constant velocity universal joint, integrally formed with a shaft portion, is inserted into the inner member in a torque transmitting manner. Also, the outer joint member is axially fastened by a nut so that it abuts the inner member. A lubricant is applied to the end face of the inner member abutting the outer joint member. The end of the outer member projects beyond the end face of the inner member.

According to the present bearing apparatus, since the lubricant is applied to the end face of the inner member that abuts the outer joint member and the end of the outer member projects beyond the end face of the inner member, it is possible to prevent or reduce the generation of stick slip noise which reduces the friction resistance between mutually abutting members. In addition, it is possible to lay the bearing apparatus on a working table with its end, inner ring side down without the possibility of the lubricant contacting the surface of a work table and without the possibility of foreign matter entering into the lubricant. Thus, it is possible to provide a bearing apparatus for a driving wheel of a vehicle which can achieve high quality by a simple structure.

According to the present disclosure, a bearing apparatus for a driving wheel of a vehicle comprises an outer member, inner member, rolling elements, outer joint member and a cover. The outer member is formed with double row outer raceway surfaces on its inner peripheral surface. The inner member includes a wheel hub with an integrally formed wheel mounting flange at one end and an axially extending cylindrical portion of a smaller diameter. At least one inner ring is press fit onto the cylindrical portion. The inner member is formed with double row inner raceway surfaces arranged opposite to the double row outer raceway surfaces. Double row rolling elements are freely rollably contained between the outer and inner raceway surfaces. The outer joint member is a constant velocity universal joint integrally formed with a shaft portion. The shaft portion is inserted into the inner member in a torque transmitting manner. The outer joint member is axially fastened by a nut so that it abuts the inner member. A lubricant is applied to the end face of the inner member abutting the outer joint member. The cover is mounted on the end of the inner member. The cover includes a fitting portion which is adapted to be inserted into the cylindrical portion. An annular bottom portion covers the end of the inner member.

According to the present bearing apparatus, the lubricant is applied to the end face of the inner member that abuts the outer joint member and a cover is mounted on the end of the inner member. The cover includes a cylindrical outer circumferential portion, a fitting portion adapted to be inserted into the cylindrical portion and an annular bottom portion to cover the end of the inner member. Thus, it is possible to prevent the lubricant from being applied to any portion of the supporting member not only during assembling steps but during transportation of the bearing apparatus. Accordingly, this ensures the quality of the bearing apparatus for a wheel of vehicle.

According to the present disclosure, since the fitting portion or the outer circumferential portion of the cover is formed with fitting ribs, which project radially outward or inward from its circumferential surface at equidistant intervals in a circumferential direction, it is possible to enable plastic deformation of the fitting portion. Thus, this improves workability during mounting and demounting of the cover. Further, this prevents the cover from easily falling out during assembly and transportation of the bearing apparatus.

According to the present disclosure, since one or more grease grooves are formed on the end face of the inner member along a circumferential direction, it is possible to increase the holding power of the grease. This further reduces the friction resistance between mutually abutting surfaces to reduce the generation of the stick slip noise.

According to the present disclosure, since the inner ring is axially secured by a caulked portion, which is formed by radially outward plastically deforming the end of the cylindrical portion, and lubricant is applied to the end face of the caulked portion, it is possible to provide a so-called "self-retain structure" which can stably maintain the preload to hold the bearing apparatus without controlling and managing the fastening force of the nut.

According to the present disclosure, the bearing apparatus for a driving wheel of a vehicle comprises an outer member formed with double row outer raceway surfaces on its inner peripheral surface. An inner member includes a wheel hub with an integrally formed wheel mounting flange at its one end and an axially extending cylindrical portion of a smaller diameter. At least one inner ring is press fit onto the cylindrical portion. The inner member is formed with double row inner raceway surfaces arranged opposite to the double row outer raceway surfaces. Double row rolling elements are freely rollably contained between the outer and inner raceway surfaces. An outer joint member of a constant velocity universal joint is integrally formed with a shaft portion. The shaft portion is inserted into the inner member in a torque transmitting manner and is axially fastened by a nut so that it abuts the inner member. Lubricant is applied to the end face of the inner member abutting the outer joint member. The end of the outer member projects beyond the end face of the inner member. Thus, it is possible to prevent or reduce the generation of stick slip noise by reducing the friction resistance between mutually abutting members. In addition, it is possible to lay the bearing apparatus on a work table with its end, inner ring side down, without the possibility of the lubricant being applied to the surface of a work table. Also, this eliminates the possibility of foreign matter entering into the lubricant. Thus, it is possible to provide a bearing apparatus for a driving wheel of a vehicle which can achieve high quality by a simple structure.

Further, according to the present disclosure, a bearing apparatus for a driving wheel of vehicle comprises an outer member formed with double row outer raceway surfaces on its inner peripheral surface. An inner member includes a wheel hub with an integrally formed wheel mounting flange at one end and an axially extending cylindrical portion of a smaller diameter. At least one inner ring is press fit onto the cylindrical portion. The inner member is formed with double row inner raceway surfaces arranged opposite to the double row outer raceway surfaces. Double row rolling elements are freely rollably contained between the outer and inner raceway surfaces. An outer joint member of a constant velocity universal joint with an integrally formed shaft portion is inserted into the inner member in a torque transmitting manner and is axially fastened by a nut to abut the inner member. Lubricant is applied to the end face of the inner member that abuts the outer joint member. A cover is mounted on the end of the inner member. The cover comprises a cylindrical outer circumferential portion, a fitting portion adapted to be inserted into the cylindrical portion and an annular bottom portion for covering the end of the inner member. Thus, it is possible to prevent the lubricant from being applied to any portion of the supporting member not only during assembling steps but during transportation of the bearing apparatus. This ensures the quality of the bearing apparatus for a wheel of a vehicle.

The present disclosure is a bearing apparatus for a driving wheel of a vehicle comprising an outer member formed with double row outer raceway surfaces on its inner peripheral surface. An inner member includes a wheel hub with an integrally formed wheel mounting flange at one end and an axially extending cylindrical portion of a smaller diameter. At least one inner ring is press fit onto the cylindrical portion. The inner member is formed with double row inner raceway surfaces arranged opposite to the double row outer raceway surfaces. Double row rolling elements are freely rollably contained between the outer and inner raceway surfaces. An outer joint member of a constant velocity universal joint is integrally formed with a shaft portion which is inserted into the inner member in a torque transmitting manner and is axially fastened by a nut so that it is abuts the inner member. Lubricant is applied to the end face of the inner member that abuts the outer joint member. A cover is mounted on the end of the inner member. The cover comprises a cylindrical outer circumferential portion, a fitting portion adapted to be inserted into the cylindrical portion and an annular bottom portion to cover the end of the inner member.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

Preferred embodiments of the present disclosure will be described with reference to accompanied drawings.

Figure 1:
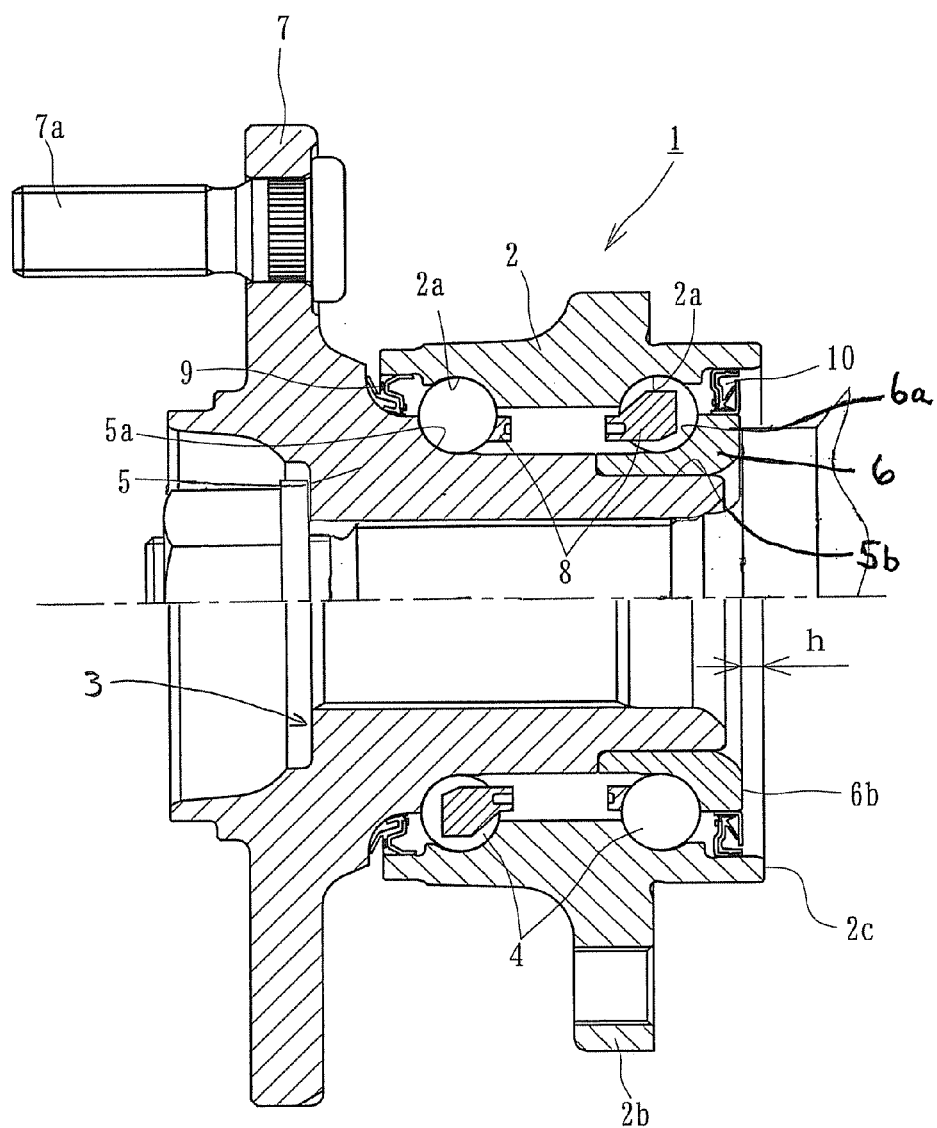
FIG. 1 is a longitudinal-section view of a bearing apparatus for a driving wheel of a vehicle according to a first embodiment.

FIG. 1 is a longitudinal-section view of a first embodiment of a bearing apparatus for a driving wheel of vehicle. In the description below, the term "outboard side" of the bearing apparatus means a side positioned outside of a vehicle body. The term "inboard side" means a side positioned inside of a vehicle body when the bearing apparatus is mounted on the vehicle body.

The bearing apparatus for a driving wheel of a vehicle is formed as a unit including a double row rolling bearing 1 and a wheel hub 5. The double row rolling bearing 1 has an outer member 2, inner member 3 and double row rolling elements (balls) 4 contained between the outer and inner members 2 and 3. The inner member 3 includes a wheel hub 5 with an integrally formed wheel mounting flange 7 at one end. The inner member 3 has one of the inner raceway surfaces (outboard side raceway surface) 5a and integrally formed cylindrical portion 5b, of a smaller diameter, extending from the inner raceway surface 5a. An inner ring 6 is press fit onto the cylindrical portion 5b. Another inner raceway surface (inboard side raceway surface) 6a is formed on its outer circumferential surface. Hub bolts 7a, to secure the wheel, are secured on the wheel mounting flange 7 at equidistant interval along its circumferential direction.

The outer member 2 is integrally formed, on its outer periphery, with a body mounting flange 2b. The mounting flange 2b is to be mounted on a suspension apparatus (not shown). The outer member 2, on its inner circumferential surface, has double row outer raceway surfaces 2a. Double row rolling elements (balls) 4 are rollably contained, via a cage 8, between the double row outer raceway surfaces 2a and opposite inner raceway surfaces 5a and 6a. Seals 9 and 10 are arranged at either end of the outer member 2 to prevent grease, contained within the bearing, from leaking and to prevent rain water and dusts from entering the bearing.

The wheel hub 5 is made of medium carbon steel such as S53C which includes carbon of 0.40~0.80% by weight. The outboard side inner raceway surface 2a, seal land portion which the seal 9 contacts, and the axially extending cylindrical portion 2b of the wheel hub 5 are surface hardened by high frequency induction quenching. They have a surface hardness of 58~64 HRC. Such a quenching pattern enables an increase in the mechanical strength of wheel hub 5 and enables it to suppress fretting at the fitting portion of the inner ring 6. This improves its durability.

On the other hand, the inner ring 3 is made of high carbon chrome bearing steel such as SUJ2. The inner ring 3 is hardened to its core by quenching to have a hardness of 58~64 HRC. The outer member 2 is made of medium carbon steel including carbon of 0.40~0.80% by weight, such as S53C. The double row outer raceway surfaces 2a are hardened by high frequency induction quenching to have a surface hardness of 58~64 HRC. Although it is shown as a double row angular ball bearing with balls 4 as the rolling elements, a double row conical rolling bearing with conical rollers, as the rolling elements, may be used. In addition, although the bearing apparatus is shown as a so-called "third generation" type, it may be used with a first or second generation type.

In this embodiment, grease, including extreme-pressure additives such as molybdenum sulfide, is applied to the end face 6b of a larger diameter of the inner ring 6. Thus, the friction resistance relative to a mating member (in this case, an outer joint member of the constant velocity universal joint (not shown)) of mutually abutting members is reduced. Thus, the generation of stick slip noise is suppressed. Furthermore, the end face 2c of the inboard side of the outer member 2 is formed to project beyond the end face 6b of the inner ring 6 by a predetermined distance "h". Such a structure makes it possible to lay the bearing apparatus on a work table with its end, inner ring side down, without the possibility of the lubricant being applied to the surface of the work table. Also, this prohibits the possibility of foreign matter from entering into the lubricant. Thus, it is possible to provide a bearing apparatus for a driving wheel of a vehicle which can achieve high quality by a simple structure.

Figure 6:
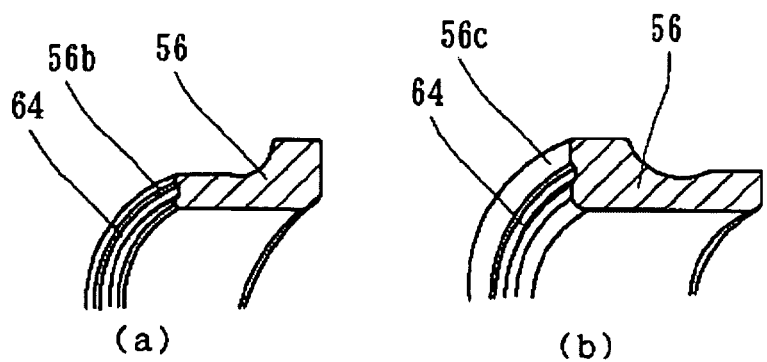
FIG. 6(a) is a partial sectional perspective view of an inner ring of FIG. 5.
FIG. 6(b) is a partial sectional perspective view of another inner ring of FIG. 5.

In this case, if grease grooves such as those shown in FIGS. 6(a) and 6(b) are formed on the end face 6b of the inner ring 6, it is possible to improve the grease holding power and thus to more effectively reduce the generation of stick slip noise.

Figure 2:
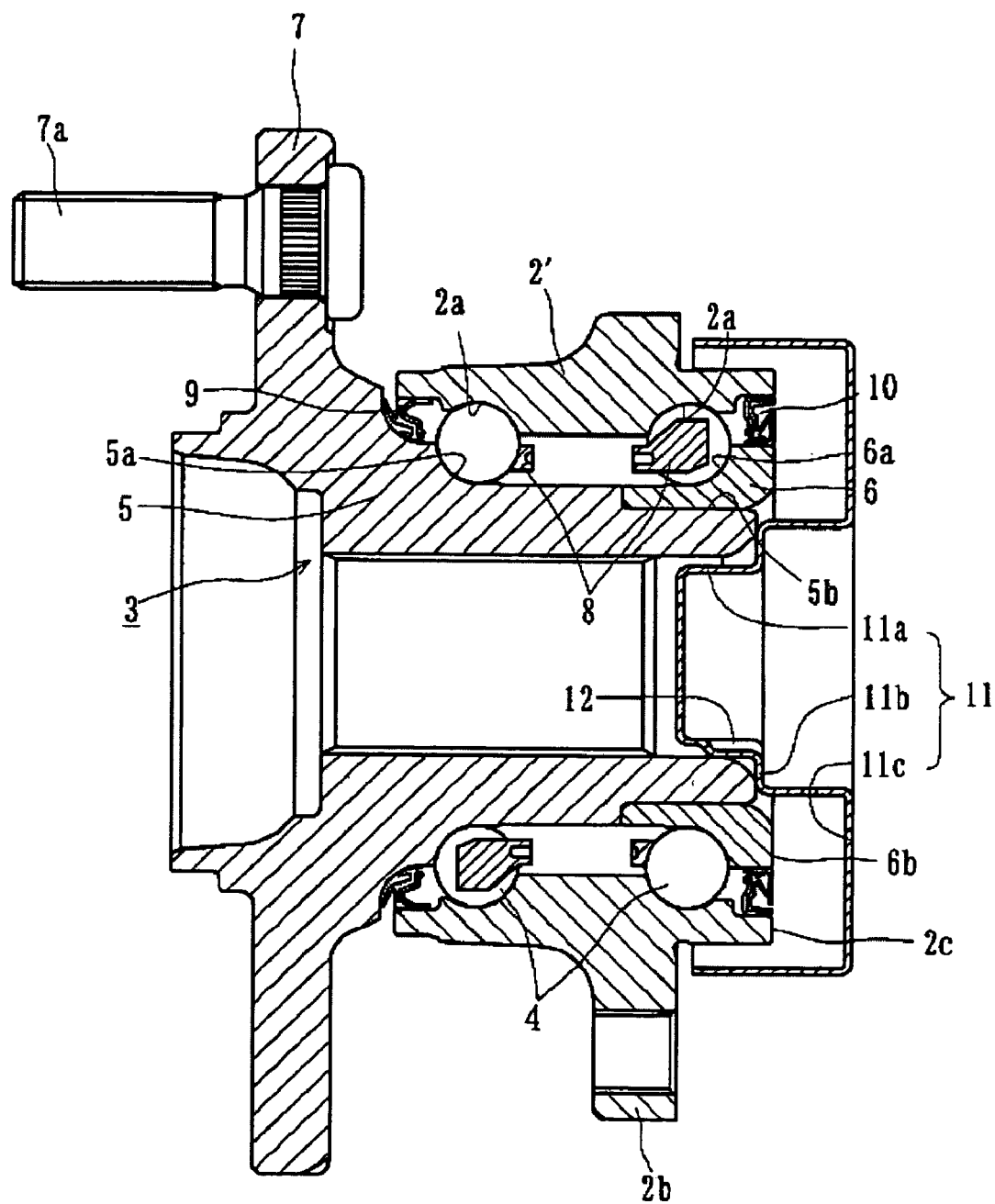
FIG. 2 is a longitudinal-section view of a bearing apparatus for a driving wheel of a vehicle according to a second embodiment.
Figure 3:
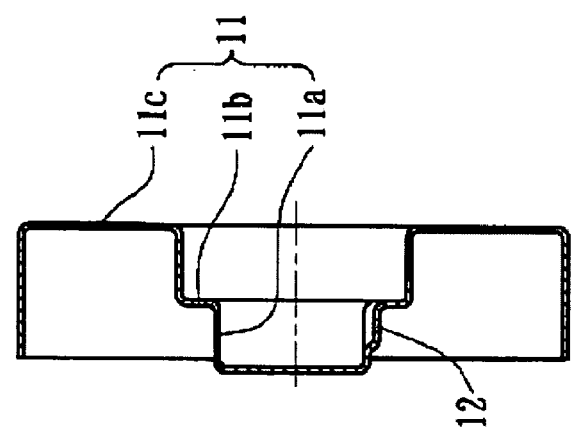
FIG. 3(a) is a front elevation view of a cover.
FIG. 3(b) is a cross-section view taken along line III-III of FIG. 3(a).
Figure 3:
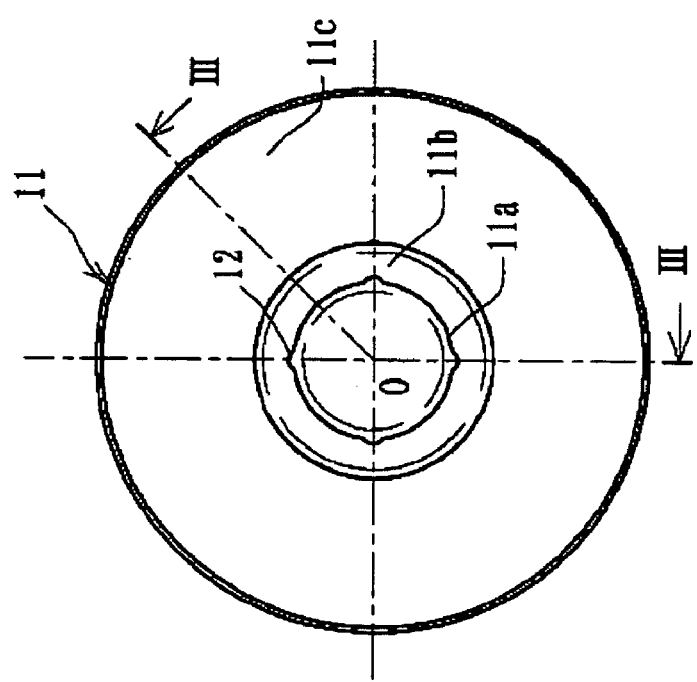

FIG. 2 is a longitudinal-section view of a bearing apparatus for a driving wheel of a vehicle according to a second embodiment. FIG. 3(a) is a front elevation view of a cover. FIG. 3(b) is a cross-section view taken along line III-III of FIG. 3(a). The same reference numerals are used to designate the same parts having the same functions in the first embodiment and detail description of them will not be repeated.

In this embodiment, the inboard side end face 2c of the outer member 2' is positioned so that it is in substantially the same plane as the end face 6b of the inner ring 6, similar to the prior art. However, it is different from the prior art in that a cover 11 is arranged on the inboard end of the bearing apparatus. The cover protects the lubricant, such as grease previously applied on the end face 6b of the inner ring, from being contaminated by foreign matter.

This cover 11 is made by press forming of austenitic stainless steel (JIS SUS 304 etc.) or preserved cold rolled steel sheet (JIS SPCC etc.) to a substantially cup-shaped configuration. The cover includes a fitting portion 11a adapted to be inserted into the cylindrical portion 5b. A stepped portion 11b is adapted to abut the end face of the cylindrical portion 5b. An annular bottom portion 11c covers the inboard end of the inner member 6. Thus, similar to the previously described embodiment, it is possible to lay the bearing apparatus on a work table on its end, with inner ring side down, without the possibility of the lubricant being applied to the surface of the work table and without the possibility of foreign matter entering into the lubricant. Thus, it is possible to provide a bearing apparatus for a driving wheel of a vehicle which can achieve high quality by a simple structure.

In addition, the cover 11 can prevent the applied lubricant from being contaminated by foreign matter outside the bearing apparatus during its transportation. The fitting portion 11a of the cover 11 is formed with fitting ribs 12. The fitting ribs 12 project radially outward from its outer circumferential surface at equidistant intervals along a circumferential direction. The fitting ribs 12 are adapted to fit into the cylindrical portion 5b, via a predetermined interference. The fitting ribs 12 enable elastic deformation of the fitting portion 11a and improve the workability to mount or demount to (or from) the bearing apparatus as well as to prevent the cover 11 from falling out of the bearing apparatus during assembly or transportation of the bearing apparatus.

Figure 4:
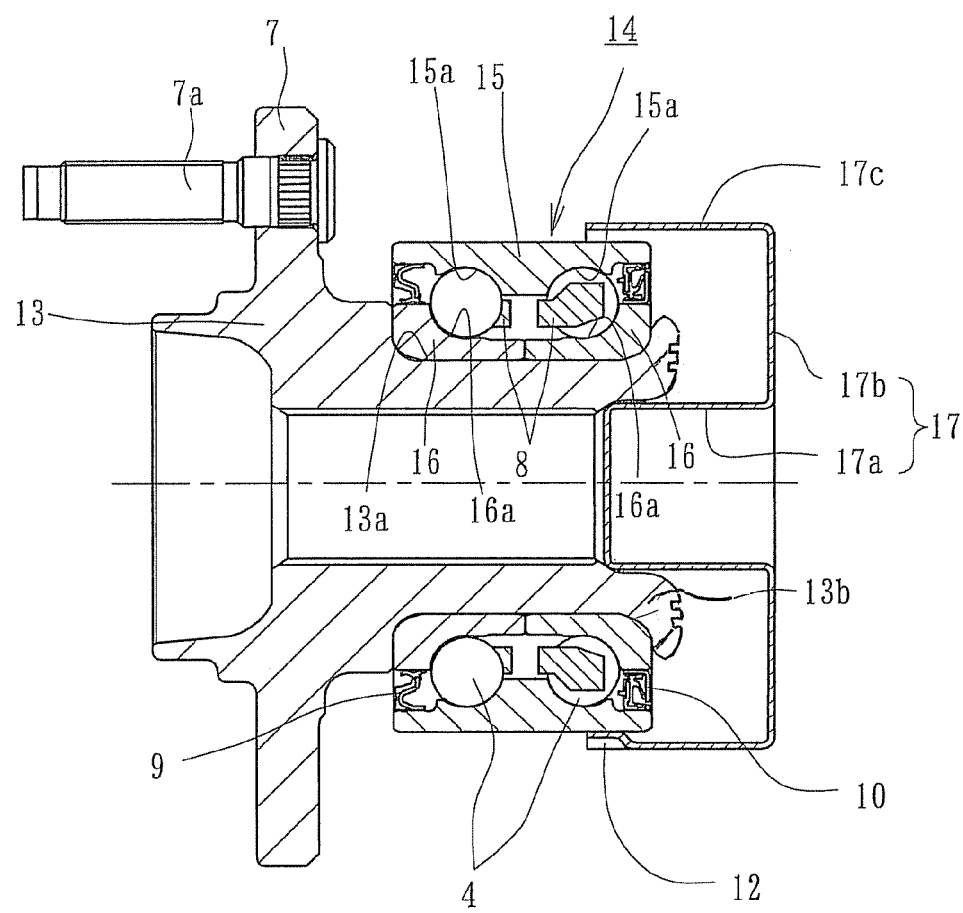
FIG. 4 is a longitudinal-section view of a bearing apparatus for a driving wheel of a vehicle according to a third embodiment.
Figure 5:
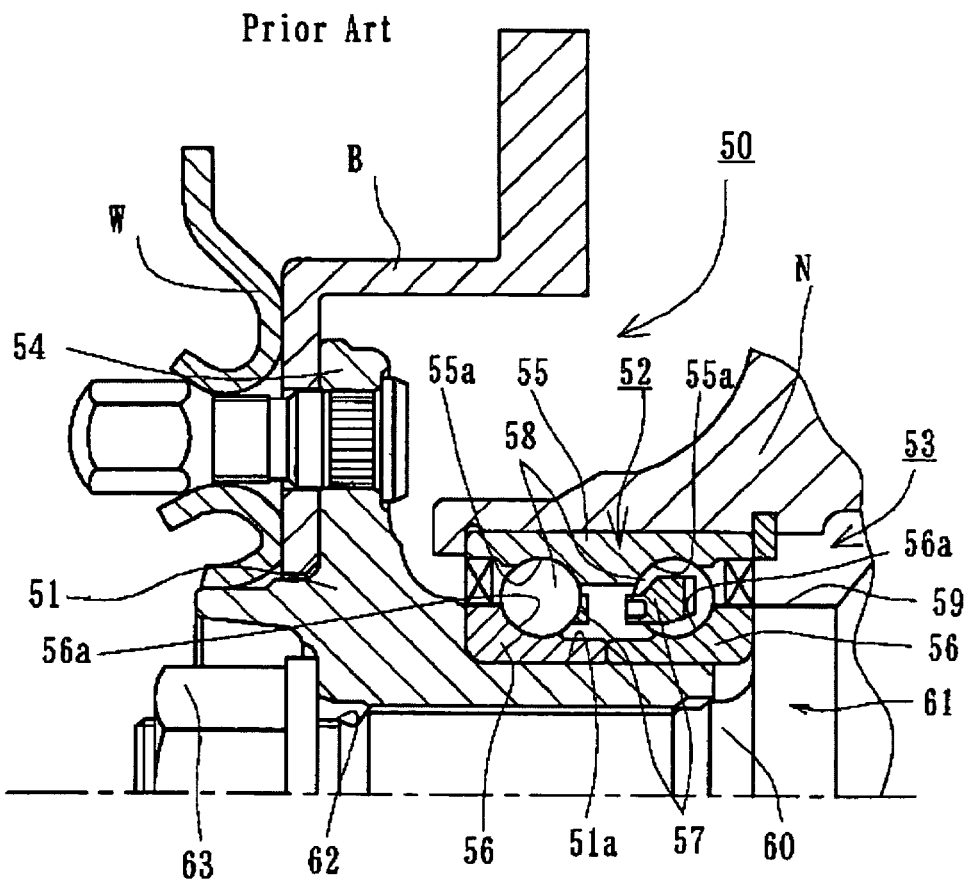
FIG. 5 is a longitudinal-section view of a bearing apparatus for a driving wheel of a vehicle of the prior embodiment.

FIG. 4 is a longitudinal-section view of a bearing apparatus for a driving wheel of vehicle according to a third embodiment. The same reference numerals are used to designate the same parts which have the same functions in the first and second embodiments and thus detail description of them will not be repeated.

The bearing apparatus for a driving wheel of a vehicle has a structure of the first generation type where the wheel hub 13 and the bearing for a wheel are united. The wheel hub 5 has an integrally formed wheel mounting flange 7 at one end and a cylindrical portion 13a, of a smaller diameter, extending from the wheel mounting flange 7. A bearing for a wheel 14 is press fit onto the cylindrical portion 13a and is axially immovably secured by plastically deforming the end of the cylindrical portion radially outward to form a caulked portion 13b. Thus, the so-called "self-retaining structure" can be provided to stably maintain the preload of the bearing 14 for a long term without controlling and managing the fastening force (axial force) generated by a nut (not shown) as in the previous embodiments.

The bearing 14 for a wheel of a vehicle is formed as a double row angular ball bearing. The bearing includes an outer ring (outer member) 15. The outer ring 15 is formed with double row outer raceway surfaces 15a on its inner circumferential surface. A pair of inner rings 16, each of which is formed with an outer circumferential surface, forms one of the double row inner raceway surfaces 16a opposite to the double row outer raceway surfaces 15a. Double row rolling elements 4 are contained, via the cage 8, between the outer and inner raceway surfaces 15a and 16a.

In this embodiment, lubricant such as grease, previously applied to the end face of the caulked portion 13b of the wheel hub 13, abuts the shoulder portion of the outer joint member of the constant velocity universal joint (not shown). The caulked portion 13b is covered by a cover 17 mounted on the inboard end of the bearing for a driving wheel of a vehicle.

This cover 17 is made by press forming of austenitic stainless steel (JIS SUS 304 etc.) or preserved cold rolled steel sheet (JIS SPCC etc.). The cover 17 includes a fitting portion 17a adapted to be inserted into the cylindrical portion 13b of the wheel hub 13. An annular bottom portion 17b covers the caulked portion 13b and the bearing for a wheel of a vehicle 14. Accordingly, similar to the previously described embodiments, it is possible to lay the bearing apparatus on a work table on its end, with inner ring side down, without the possibility of the lubricant being applied to the surface of a work table and without the possibility of foreign matter entering into the lubricant. Thus, it is possible to provide a bearing apparatus for a driving wheel of a vehicle which can achieve high quality by a simple structure.

An outer circumferential portion 17c of the cover is formed with fitting ribs 12. The fitting ribs 12 project radially inward from the inner circumferential surface at equidistant intervals along a circumferential direction. The fitting ribs 12 enable elastic deformation of the circumferential portion 17c and thus improve the workability in mounting or demounting to (or from) the bearing apparatus.

The bearing apparatus for a wheel of driving wheel of a vehicle can be applied to automobile manufacturing industries without causing the problem associated with lubricant, such as grease, applied to a surface of the work table.

The present invention has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A bearing apparatus for a driving wheel of vehicle adapted to be coupled with an outer joint member of a constant velocity universal joint integrally formed with a shaft portion to be inserted into an inner member in a torque transmitting manner and is axially fastened by a nut so that it is abuts the inner member, comprising;

an outer member formed with double row outer raceway surfaces on its inner peripheral surface, an integrally formed mounting flange on an outer periphery of said outer member, a bolt hole formed in said flange, said mounting flange to be mounted on a suspension apparatus;

an inner member including a wheel hub having an integrally formed wheel mounting flange at one end and an axially extending cylindrical portion of a smaller diameter, and at least one inner ring press fit onto the cylindrical portion, and said inner member formed with double row inner raceway surfaces arranged opposite to the double row outer raceway surfaces;

double row rolling elements freely rollably contained between the outer and inner raceway surfaces;

lubricant is applied to the end face of the inner member abutting the outer joint member, and the outer member includes an end face that projects beyond the end face of the inner member a small predetermined distance such that the outer member end face prohibits the inner ring end face, with its lubricant, from contacting a work table.

2. A bearing apparatus for a driving wheel of a vehicle of claim 1 wherein one or more grease grooves are formed on the end face of the inner member along a circumferential direction.

* * * * *